United States Patent
Mowat

[11] 3,718,896
[45] Feb. 27, 1973

[54] GUIDING DEVICES
[76] Inventor: Geoffrey C. Mowat, 37 Cliff Road, St. Heliers, New Zealand
[22] Filed: March 27, 1970
[21] Appl. No.: 23,283

[30] Foreign Application Priority Data
March 31, 1969 New Zealand..........................155980

[52] U.S. Cl. ......................340/1 R, 340/3 E, 343/7.5
[51] Int. Cl..............................................G01s 9/68
[58] Field of Search..........340/1 R, 3 E, 3 R; 343/7.5

[56] References Cited
UNITED STATES PATENTS

| | | |
|---|---|---|
| 2,580,560 | 1/1952 | Larsen...................................340/3 E |
| 2,511,599 | 6/1950 | Rochester.............................340/3 E |
| 2,738,487 | 3/1956 | Hackley................................340/3 R |
| 3,360,775 | 12/1967 | Schroeder.............................340/32 |

*Primary Examiner*—Richard A. Farley
*Attorney*—Holman, Glascock, Downing & Seebold

[57] ABSTRACT

A blindman's cane has contained within it a transmitter that transmits pulses of energy in a directional manner and also a receiver which accepts the first returned pulse of those transmitted and rejects all others for a predetermined period. The first returned pulse activates a device such as a vibrator to give the user an indication of an approaching object. The rate of vibration of the vibrator alters to give an indication of the closeness of the object.

5 Claims, 1 Drawing Figure

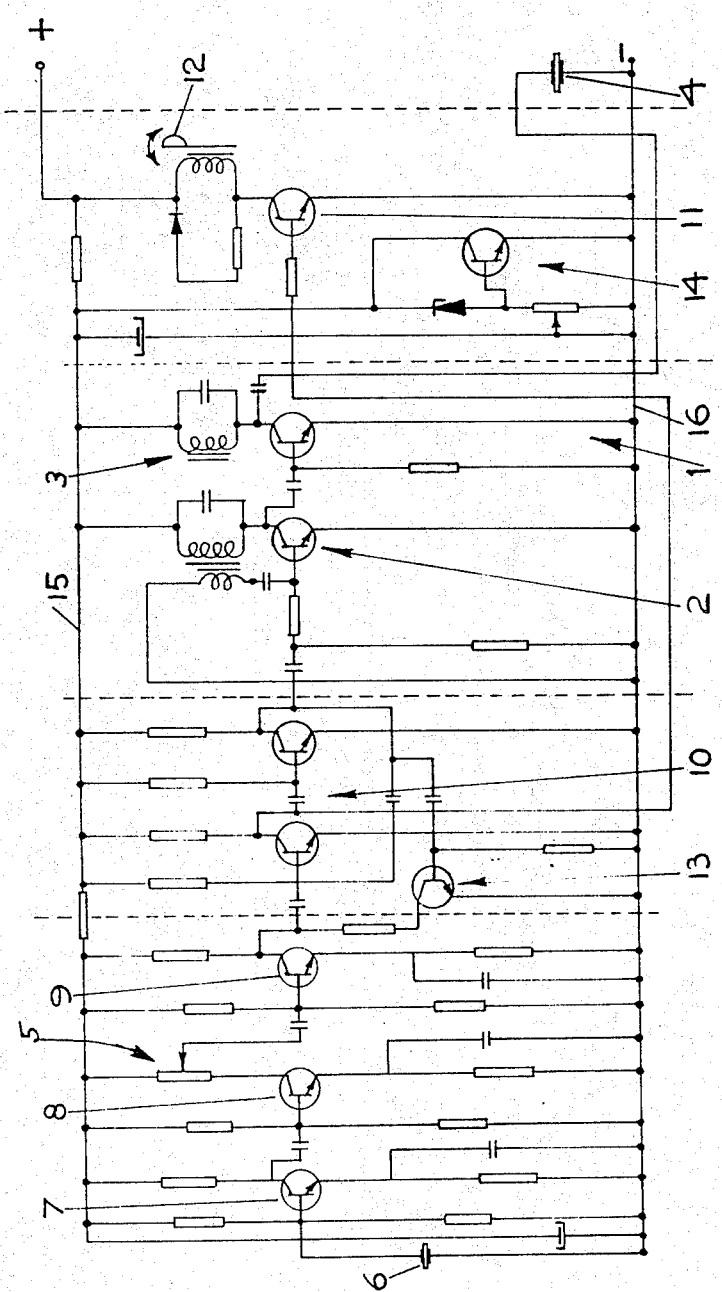

GUIDING DEVICES

This invention relates to guiding devices and has been devised particularly, though not solely for use by the blind.

Guiding devices have been devised in which a signal is sent out from the device and is reflected from an object and returned to the device to operate a signalling means to indicate to the person that an object is present. However, there has been difficulty in that there has been no selection by the devices at present in operation so that a confusing signal is returned and it requires considerable experience in interpretation by the user or tends to confuse background objects with objects which are in the foreground.

It is therefore, an object of the present invention to provide a guiding device which will obviate or minimize the foregoing disadvantages in a simple, yet effective manner, or which will at least provide the public with a useful choice.

Accordingly, the invention consists in a guiding device comprising a transmitting means adapted to transmit pulses of energy in a directional manner, a receiving means adapted to receive reflected pulses of energy passing back to the apparatus from objects which have reflected the transmitted pulses, selecting means adapted to select a first reflected pulse received by said receiving means after that transmitted pulse has been sent out from said transmitting means actuating means actuated by said first reflected pulse, subsequent reflections of that transmitted pulse not modifying said actuation of said actuating means, indicating means actuated by said actuating means and adapted to indicate to a user the distance from the user of the object which returns said first reflected pulse and resetting means adapted to reset said actuating means to enable actuation thereof by further first reflected pulses at desired intervals.

One preferred form of the invention will now be described with reference to the accompanying circuit diagram.

In the preferred form of the invention a guiding device is provided which has been designed for use in guiding the blind but, of course, it could have other applications as well, e.g. by military personnel operating in darkness. However, the preferred form of the invention takes the form of a wand or walking stick in which the following equipment is mounted. Transmitting means 1 is provided which comprises an oscillator 2 and an amplifier 3. The oscillator 2 and amplifier 3 are capable of producing pulses, e.g. trains of electrical oscillations at frequencies which oscillations are converted into pulses of ultra sonic soundwave energy, by a transducer 4.

The transmitting means 1 is arranged to emit a train of oscillations to the transducer 4 approximately eight times per second when no reflected signal is being received. The transducer 4 is arranged to direct the pulses of energy over a beamed path which could be changed by a range setting device.

The device also includes a further transducer 6 operating as a receiver of reflected pulses of energy. The transducer 6 converts the pulses it receives into pulses of electrical energy and feeds the electrical pulses into a receiving means 5. The receiving means 5 consists of amplifiers 7, 8 and 9 which amplify the electrical energy pulse and pass it to an asymmetrical multivibrator 10 which forms a selecting means and also an actuating means. When no reflected signal is being received the multivibrator 10 is free running and the transmitter 1 emits a short pulse of energy at fixed slow intervals of time, for example, approximately eight times per second as mentioned above. However when objects in front of the aid are close enough to reflect suitable signals the first received pulse, from the nearest object, in the arc of the beamed path, will trigger the multivibrator 10 into its alternate operating state where it remains for a pre-determined period of time and where it is insensitive to any pulses following the first therefore the amplitude of any pulses following the first will have fallen away before the multivibrator 10 reverts back to its original state. The multivibrator 10 controls the transmitter 1, which emits a short train of pulses each time the multivibrator 10 reverts to its original state, and also controls an indicator amplifier 11 and an indicator means preferably in the form of a vibrator 12 which is deflected once with each cycle of events.

Thus the reflected pulse received from the nearest object in the beamed path triggers the multivibrator 10 which controls the cycle of events. After a delay period the transmitter 1 is again pulsed into operation by the multivibrator 10 and this sequence of events continues. The delay period provided by the circuit of the multivibrator 10 varies and gets shorter as the signal path between the two transducers 4 and 6 shortens. The transmitted pulse is also received back in a shorter time as the path becomes shorter. The unit responds therefore, only to the nearest object in its path and the repetition rate varies with the distance of the object thus giving the user an indication of direction and distance because the vibrator 12 vibrates at a frequency which increases as an object is approached.

Also included in the circuit are an attenuating means 13 which severely attenuates any pulse propogating from the transducer 4 direct (i.e. not reflected) so that it will not trigger the multivibrator 10 and voltage regulating device 14 which ensures that the voltage between the rails 15 and 16 is kept constant.

The circuiting fits inside a hollow cylindrical blind-man's cane, with the indicator 12, in the form of a vibrator, positioned on the cane so that it can be felt easily by a finger or thumb when the cane is held in the normal way.

It will be seen from the foregoing, that a very satisfactory construction is given which enables objects to be selectively recognized by the device so as to indicate to the operator the presence of objects near to him against a general background of objects. Thus it will select a telegraph or power pole from a building behind that pole and indicates to the user that the power pole is closer to him than the building.

I claim:

1. A guiding or distance measuring device comprising a transmitting means adapted to transmit pulses of energy in a directional manner, a receiving means adapted to receive reflected pulses of energy passing back to the device from objects which have reflected the transmitted pulses, selecting means including an astable multivibrator, said selecting means being adapted to select the first reflected pulse received by said receiving means after a transmitted pulse has been sent out from said transmitting means, selection of said first reflected pulse causing the operating state of said multivibrator to reverse from a first state to a second state for a selected predetermined period of time so that reflected pulses arriving from objects further afield do not affect said multivibrator, indicating means actuated by said multivibrator and adapted to indicate to a user the distance from the user of the object which returns said first reflected pulse, and automatic recycling means wherein said multivibrator after said selected predetermined period of time, reverts to its first state, from its second state, at the same time pulsing the transmitter into operation thus re-commencing the cycle of events.

2. A guiding device as claimed in claim 1, wherein the operating cycle of said cycle of events is in an inverse relationship to the range of said first reflected pulse.

3. A guiding device as claimed in claim 2, wherein the parameters of said multi-vibrator circuit are such that said selected predetermined period of time becomes shorter as the path travelled by said first reflected pulse becomes shorter, said shortening of said selected predetermined period of time being in addition to the reduction of time said multivibrator is in said first state because of the reduced path travelled by said first reflected pulse.

4. A guiding device as claimed in claim 3, wherein said indicating means comprises an electro-magnetically operable vibrating means on which the user can place a finger or other part of his body, the frequency of the vibration indicating the distance of the object from the user.

5. A guiding device as claimed in claim 4, wherein said transmitting means includes a transducer which sends out energy in the form of sound waves of ultrasonic frequency, and said receiving means comprises a transducer which converts received energy in the form of sound waves of ultra sonic frequency into pulses of electrical energy, and a series of amplifiers.

* * * * *